Nov. 27, 1928.
G. C. CHERRY
MOSQUITO AND INSECT TRAP
Filed Nov. 4, 1927
1,693,368
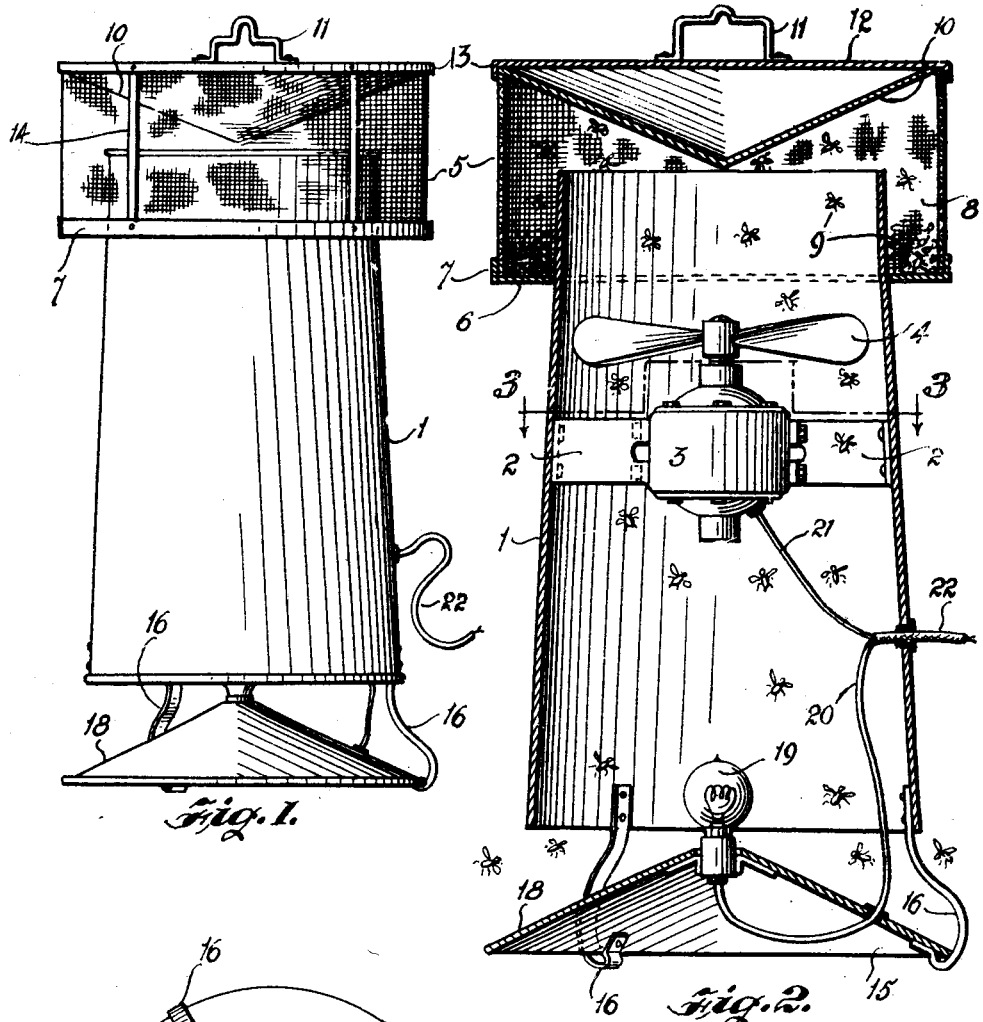
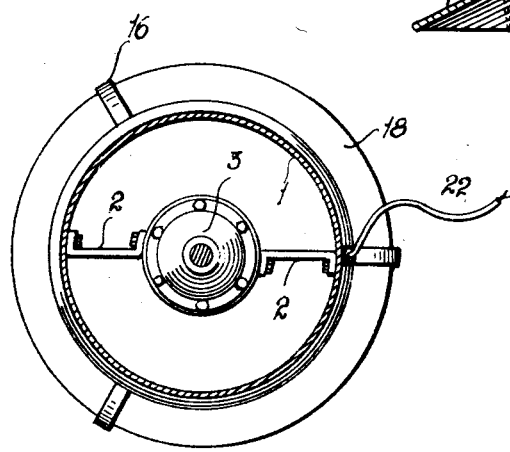
George C. Cherry,
INVENTOR
BY John M. Spellman
ATTORNEY Patented Nov. 27, 1928.

1,693,368

UNITED STATES PATENT OFFICE.

GEORGE C. CHERRY, OF DALLAS, TEXAS, ASSIGNOR TO EFFIE MAY CHERRY, OF DALLAS, TEXAS.

MOSQUITO AND INSECT TRAP.

Application filed November 4, 1927. Serial No. 231,058.

This invention aims to provide an improved trap for mosquitoes and other insects, and has particular reference to that type of trap in which a light or other attracting means is employed to bring the insects near the trap entrance, whereupon air suction created by a fan or other source serves to forcibly draw the insects into the trap.

More particularly, the present invention provides a light reflecting means to more effectively disperse the rays of light over a broader area in attracting the insects, and for causing the insects drawn into the trap to be deposited by a deflecting means into a receptacle.

The above and other minor objects will become apparent from a perusal of the following detailed description, taken in connection with the accompanying drawings, and wherein:

Figure 1 is a side elevational view of the invention.

Figure 2 is a vertical sectional view of the same, on an enlarged scale; and

Figure 3 is a cross-sectional view, taken along the line 3—3 of Figure 2.

Proceeding in accordance with the drawings, wherein the various parts of the invention will be referred to separately and indicated by proper numerals, 1 denotes an elongated cone-shaped element, open at top and bottom and in which is disposed brackets 2 for supporting a motor 3. The motor drives a fan 4, which serves to create a suction from the bottom opening of the element 1 through the top opening for drawing the insects into a receptacle 5, constructed of fine wire mesh screen. The bottom 6 of the receptacle is made of metal or other material and has an upturned annular flange 7 forming a brace for the screen walls thereof. The bottom 6 has also an opening as indicated in the drawings and by means of which the receptacle is securely yet removably fastened to the element 1—the upper edge of the element 1, the bottom 6 and the walls of the receptacle forming an annular pocket 8 in which the insects 9 are deposited.

Attached to or made a part of the walls of the receptacle and at the upper part or rim thereof is a cone 10, the apex of which occupies a central position over the upper opening of the element 1. This cone is preferably of some light metal and provides a deflecting element so as to cause the insects drawn in and upwardly by the suction of the fan to drop into the annular pocket 8. A handle 11 is attached to a metallic top portion 12 for the purpose of lifting off the receptacle when the pocket or trap is full of insects. An upper rim 13 serves to reinforce or provide a frame for the walls of the receptacle, in addition to the upright bars or strips 14.

Spaced apart from the lower opening of the element 1 is a cone 15 which forms an important object of the invention. This cone is attached to the element 1 by the braces 16 and the upper surface thereof at 18 is of bright metal, capable of retaining a high polish and serves to reflect the light from an electric globe 19, seated in an opening of the apex of the cone, and connected to a source of electric current by the wires 20, in the same circuit as the motor which is connected to the wires 21. The cone 15 projects beyond the walls of the element 1 and provides a support therefor.

In operation of the trap, the insects are attracted from a distance by the reflected light from the globe 19 and as they come within the draft or suction created by the fan, are drawn upwardly between the lower opening of the element 1 and the top of the cone 15. The insects are forced through the element 1 and then thrown against the lower surface of the upper cone 10, which deflects them into the pocket 8.

The device may be suspended from an elevated object if desired, and the motor and globe supplied with current through the cord 22 from any suitable source of power. When the device is used outside a building, a storage battery may be employed for the electric current, or a small dynamo driven by a gas engine may be utilized.

The trap may be used for destroying various kinds of insects, such as mosquitoes, candle bugs and the like, which are attracted by a light. If desired, the globe or lamp may be dispensed with, for certain species of insects, such as flies, and edible bait of some sort substituted. Whatever attracting means is used, serves to bring the insects into range of the suction created by the fan, where they are thereby drawn into the trap and destroyed.

Obviously, the receptacle for collecting the insects may be made to extend downwardly along the wall of the body or element 1 of the device or extended directly outward from the body thereof to provide a large and more capacious pocket. Likewise other modifications may be made without departing from the spirit and meaning of the invention and in keeping with the claims appended hereto.

What is claimed is:

1. An insect trap comprising a cylindrical, hollow element, a cone spaced from the bottom thereof, a cone spaced from the top thereof, insect attracting means on the lower cone, means in the cylindrical element for creating air suction therethrough, and a receptacle on the cylindrical element for collecting the insects.

2. An insect trap comprising a cylindrical, hollow element, open at both ends, a cone spaced apart and connected to the lower end of said element, said cone having one side polished and providing a mirror or light reflecting means; a lamp seated in the cone; means for creating air suction through said cylindrical element and between said element and said cone to draw insects upwardly through the element; a screened receptacle having an opening through which the upper part of said element protrudes; said receptacle including a cone suspended over the upper opening of said element and serving to deflect insects drawn upward into said receptacle.

3. An insect trap as set out in claim 2, said receptacle adapted to be seated over the upper end of said cylindrical element, forming a pocket between the outer wall of said protruding portion of the element into the receptacle and the inner wall of said receptacle; the insects being deflected into the pocket on striking said upper cone in the receptacle.

4. An insect trap as set out in claim 1, and wherein said lower cone has one surface highly polished to provide a mirror to reflect light from a lamp.

5. An insect trap as set out in claim 1, said receptacle for collecting the insects projecting beyond the walls of said cylindrical receptacle and forming a pocket in which the insects are collected.

6. An insect trap comprising a cone-shaped, hollow cylindrical element, a cone spaced apart from the lower end thereof, a cone spaced apart from the upper end thereof, both ends of the element being open; a light globe in the lower cone, means for creating air suction within and adjacent the cylindrical element; an insect collecting receptacle in which the upper cone is seated; said lower cone having a mirror on one side to reflect light from the globe on the lower cone.

In testimony whereof I affix my signature.

GEORGE C. CHERRY.